United States Patent
Nel

(10) Patent No.: US 10,200,816 B2
(45) Date of Patent: Feb. 5, 2019

(54) METHOD AND APPARATUS FOR SELECTIVE ZONE-BASED COMMUNICATIONS

(71) Applicant: HERE Global B.V., Eindhoven (NL)

(72) Inventor: Dirk Nel, Saint Charles, IL (US)

(73) Assignee: HERE Global B.V., Eindhoven (NL)

( * ) Notice: Subject to any disclaimer, the term of this patent is extended or adjusted under 35 U.S.C. 154(b) by 8 days.

(21) Appl. No.: 15/042,720

(22) Filed: Feb. 12, 2016

(65) Prior Publication Data

US 2017/0238134 A1    Aug. 17, 2017

(51) Int. Cl.
H04W 4/021    (2018.01)
(52) U.S. Cl.
CPC ................... *H04W 4/022* (2013.01)
(58) Field of Classification Search
USPC .............. 455/456.1–457; 705/14.4–14.64
See application file for complete search history.

(56) References Cited

U.S. PATENT DOCUMENTS

| | | | |
|---|---|---|---|
| 8,335,524 B2 | 12/2012 | Shutter | |
| 8,341,192 B2 | 12/2012 | Weiland et al. | |
| 8,688,071 B1 * | 4/2014 | Daly | H04B 1/38 455/404.2 |
| 8,755,824 B1 * | 6/2014 | Wang | H04W 4/021 340/539.13 |
| 9,860,699 B1 * | 1/2018 | Vaynblat | H04L 67/26 |
| 2011/0112892 A1 * | 5/2011 | Tarantino | G06Q 30/02 705/14.1 |
| 2012/0306660 A1 | 12/2012 | Stopel et al. | |
| 2013/0275221 A1 * | 10/2013 | Zeto, III | G06Q 30/0261 705/14.58 |
| 2014/0164118 A1 * | 6/2014 | Polachi | G06Q 30/0259 705/14.57 |
| 2014/0222568 A1 * | 8/2014 | Weitzman | G06Q 30/0261 705/14.57 |
| 2015/0148060 A1 * | 5/2015 | Parab | H04W 4/021 455/456.1 |
| 2016/0150367 A1 * | 5/2016 | Anand | H04W 4/021 455/456.3 |

* cited by examiner

*Primary Examiner* — Marcus Hammonds
(74) *Attorney, Agent, or Firm* — Alston & Bird LLP

(57) ABSTRACT

A method, apparatus and computer program product are described to provide geographically-related features and services based at least in part upon the data provided by a mapping database, such as by providing for selective communication with user devices in a manner dependent upon a mapping database. In the context of a method, the location of a user device is determined. The method also determines whether the location of the user device is within an inner zone or a proximity zone extending at least partially about the inner zone. The inner zone is defined to encompass a reference point. If the user device is within the inner zone, a message is caused to be transmitted to the user device. However, if the user device is in the proximity zone, a function is performed relative to the user device that differs from causing the message to be transmitted to the user device.

24 Claims, 7 Drawing Sheets

METHOD AND APPARATUS FOR SELECTIVE ZONE-BASED COMMUNICATIONS

TECHNOLOGICAL FIELD

An example embodiment relates generally to selectively communicating with user devices and, in particular, selectively communicating with user devices in a manner dependent upon zones defined from a mapping database.

BACKGROUND

Mobile or portable computing platforms provide a wealth of functionality. As a result of their mobility or portability, such computing platforms may be carried by or otherwise travel with users and, as a result, may perform various geographically-related features and services. In this regard, the geographically-related features and services may be provided based upon the rich mapping data that is available to the computing platforms including points of interest, links and nodes as maintained by a mapping database. There are a variety of mobile or portable computing platforms that provide geographically-related features and services including dedicated computing devices, such as in-vehicle navigation systems and personal navigation systems, as well as more general purpose computing devices, such as mobile telephones, portable personal computers, such as notebook computers and tablets, personal digital assistants and the like.

One example of the geographically-related features and services provided by mobile or portable computing platforms is route calculation and guidance. In this regard, some mobile or portable computing platforms can determine one or more routes to travel between an origin and a destination, thereby offering guidance to a user prior to or during the trip. In this regard, based upon the physical location of the user, such as may be determined by a global positioning system (GPS), a navigation application executed by a mobile or portable computing platform may analyze various routes from the current location of the user to the destination and may identify a preferred route of travel therebetween. The mobile or portable computing platform may then provide the user with information regarding the preferred route, such as in the form of a map which depicts the route and/or instructions that direct the user along the route to the destination.

As another example, some mobile or portable computing platforms may provide business or person location services, such as an electronic form of the yellow or white pages. In addition to simply identifying the location of a certain type of business or a particular person, such as a contact of the user, mobile or portable computing platforms may identify the locations of businesses or individuals based upon the current location of the user. For example, the mobile or portable computing platforms may identify all businesses or persons of a certain type within a predefined range of a user's current location. Alternatively, the mobile or portable computing device may identify the closest business or person of a particular type relative to the current location of the user.

Although a variety of geographically-related features and services are provided by a mobile or portable computing platforms, it may be desirable to provide additional geographically-related features and services that further leverage the rich data stored and maintained by mapping databases.

BRIEF SUMMARY

A method, apparatus and computer program product are provided in accordance with an example embodiment in order to provide additional geographically-related features and services based at least in part upon the data provided by a mapping database. In this regard, the method, apparatus and computer program product of an example embodiment may be configured to provide messages to user devices in instances in which a user device is determined to be in a particular zone, as defined by a mapping database. However, the method, apparatus and computer program product of this example embodiment may be configured to perform other functions in instances in which the user device is determined to be proximate to, but not yet within the zone, thereby increasing the processing efficiency and timeliness associated with the transmission of messages to user devices within the zone.

In an example embodiment, a method is provided for selectively communicating with user devices in a manner dependent upon a mapping database. The method includes determining a location of a user device. The method in this example embodiment also determines whether the location of the user device is within an inner zone or a proximity zone extending at least partially about the inner zone. The inner zone is defined to encompass a reference point. In an instance in which the user device is determined to be within the inner zone, the method causes a message to be transmitted to the user device. However, in an instance in which the user device is determined to be in the proximity zone, the method performs a function relative to the user device that differs from causing the message to be transmitted to the user device.

The method of an example embodiment performs the function by performing an analysis of a user associated with the user device that is determined to be in the proximity zone in order to identify a type of message to be transmitted to the user device in an instance in which the user device is subsequently determined to be within the inner zone. In this regard, the method may perform the analysis of the user associated with the user device that is determined to be in the proximity zone by determining an association between the user and the reference point. In this example embodiment, the method may cause a message to be transmitted by causing an advertising message to be transmitted to the user device in an instance in which the user device has determined the transition from the proximity zone to the inner zone.

The reference point of an example embodiment includes a point address of a land parcel. In this example embodiment, the method also includes defining the inner zone based at least in part upon the size of the land parcel. In another embodiment, the reference point is positioned based at least in part upon a building footprint. The method of an example embodiment determines whether the location of the user device is within the inner zone or the proximity zone by accessing a data layer that defines the inner and proximity zones for each of a plurality of reference points. In this example embodiment, the data layer is a different layer than cartographic layers that define building footprints and land parcels and a map layer that includes a plurality of links, nodes and points of interest. The method of an example embodiment also includes determining whether an inner zone is to be defined to encompass a reference point based upon one or more characteristics of the reference point. Additionally or alternatively, the method of an example embodiment defines the inner zone that encompasses a reference point to have a size that is dependent upon one or more characteristics of the reference point.

In another example embodiment, an apparatus is provided for selectively communicating with user devices in a manner dependent upon a mapping database. The apparatus of this example embodiment includes at least one processor and at least one memory including computer program instructions with the at least one memory and the computer program instructions, with the at least one processor, causing the apparatus at least to determine a location of the user device. The at least one memory and the computer program instructions, with the at least one processor, also cause the apparatus to determine whether the location of the user device is within an inner zone or a proximity zone extending at least partially about the inner zone. The inner zone is defined to encompass a reference point. In an instance in which the user device is determined to be within the inner zone, the at least one memory and the computer program instructions, with the at least one processor, cause the apparatus to cause a message to be transmitted to the user device. However, in an instance in which the user device is determined to be in the proximity zone, the at least one memory and the computer program instructions, with the at least one processor, cause the apparatus to perform a function relative to the user device that differs from causing the message to be transmitted to the user device.

The at least one memory and the computer program instructions, with the at least one processor, cause the apparatus to perform the function by performing an analysis of the user associated with the user device that is determined to be in the proximity zone in order to identify the type of message to be transmitted to the user device in an instance in which the user device is subsequently determined to be within the inner zone. The at least one memory and computer program instructions, with the at least one processor, cause the apparatus of this example embodiment to perform the analysis of the user associated with the user device that is determined to be in the proximity zone by determining an association between the user and the reference point. Further, the at least one memory and the computer program instructions, with the at least one processor, cause the apparatus of this example embodiment to cause the message to be transmitted by causing an advertising message to be transmitted to the user device in an instance in which the user device is determined to transition within the proximity zone to the inner zone.

The reference point of an example embodiment includes a point address of a land parcel. In this example embodiment, the at least one memory and the computer program instructions, with the at least one processor, also cause the apparatus to define an inner zone based at least in part upon the size of the land parcel. The reference point of another example embodiment is positioned based at least in part upon a building footprint. The at least one memory and the computer program instructions, with the at least one processor, cause the apparatus of an example embodiment to determine whether the location of the user device is within the inner zone or the proximity zone by accessing a data layer that defines the inner and proximity zones for each of a plurality of reference points. In this example embodiment, the data layer is a different layer than cartographic layers that define building footprints and the land parcels and a map layer that includes a plurality of links, nodes and points of interest.

In a further example embodiment, a computer program product is provided for selectively communicating with user devices in a manner depending upon a mapping database. The computer program product includes at least one non-transitory computer-readable storage medium bearing computer program instructions embodied therein for use with a computer with the computer program instructions including program instructions which, when executed, cause the computer at least to determine a location of a user device. The computer program instructions further include program instructions which, when executed, cause the computer to determine whether the location of the user device is within an inner zone or a proximity zone extending at least partially about the inner zone. The inner zone is defined to encompass a reference point. In an instance in which the user device is determined to be within the inner zone, the computer program instructions include program instructions which, when executed, cause the computer to cause a message to be transmitted to the user device. However, in an instance in which the user device is determined to be in the proximity zone, the computer program instructions include program instructions which, when executed, cause the computer to perform a function relative to the user that differs from causing a message to be transmitted to the user device.

The program instructions configured to perform the function may include program instructions configured to perform an analysis of a user associated with the user device that is determined to be in the proximity zone in order to identify the type of message to be transmitted to the user device in an instance in which the user device is subsequently determined to be within the inner zone. In this example embodiment, the program instructions that are configured to perform the analysis of the user associated with the user device that is determined to be in the proximity zone may include program instructions configured to determine an association between the user and the reference point. In this example embodiment, the program instructions configured to cause the message to be transmitted may include program instructions configured to cause an advertising message to be transmitted to the user device in an instance in which the device is determined to transition from the proximity zone to the inner zone.

The reference point of an example embodiment includes a point address of a land parcel. In this example embodiment, the computer program instructions further include program instructions which, when executed, cause the computer to define the inner zone based at least upon the size of the land parcel. The reference point of another example embodiment is positioned based at least in part upon a building footprint. In an example embodiment, the program instructions configured to determine whether the location of the user device is within the inner zone or the proximity zone include program instructions configured to access the data layer that defines the inner and proximity zones for each of a plurality of reference points. The data layer is a different layer than cartographic layers that define building footprints and land parcels and a map layer that includes a plurality of links, nodes and points of interest.

In yet another example embodiment, an apparatus for selectively communicating with user devices in a manner dependent upon a mapping database is provided that includes means for determining a location of a user device. The apparatus of this example embodiment also includes means for determining whether the location of the user device is within an inner zone or a proximity zone extending at least partially about the inner zone. The inner zone is defined to encompass a reference point. In an instance in which the user device is determined to be within the inner zone, the apparatus includes means for causing a message to be transmitted to the user device. However, in an instance in which the user device is determined to be in the proximity zone, the apparatus includes means for performing a function relative to the user device that differs from causing a message to be transmitted to the user device.

BRIEF DESCRIPTION OF THE DRAWINGS

Figure 1:
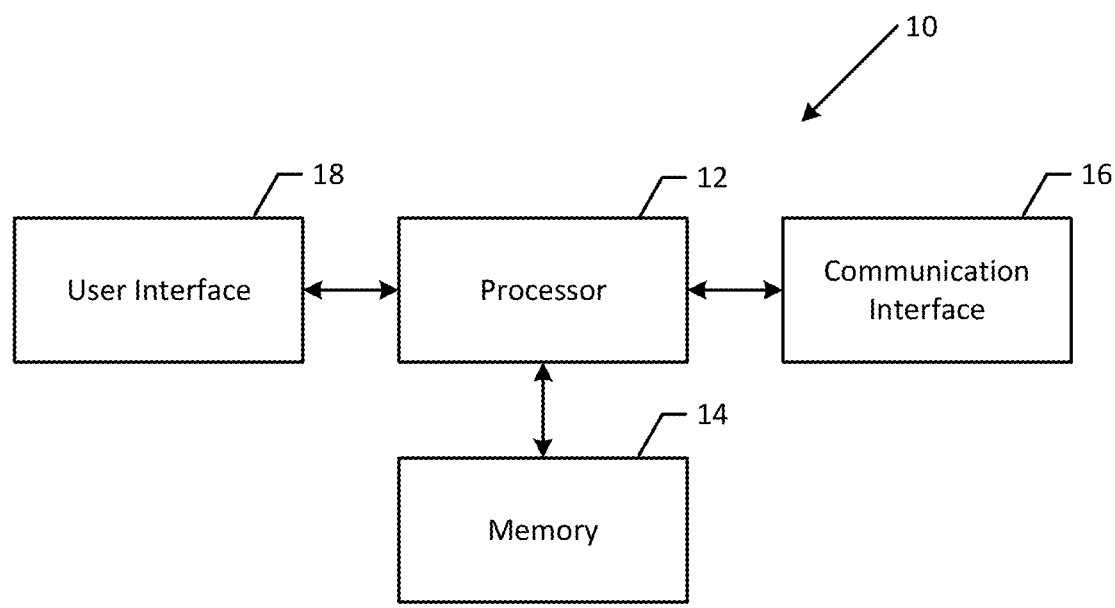
Figure 2:
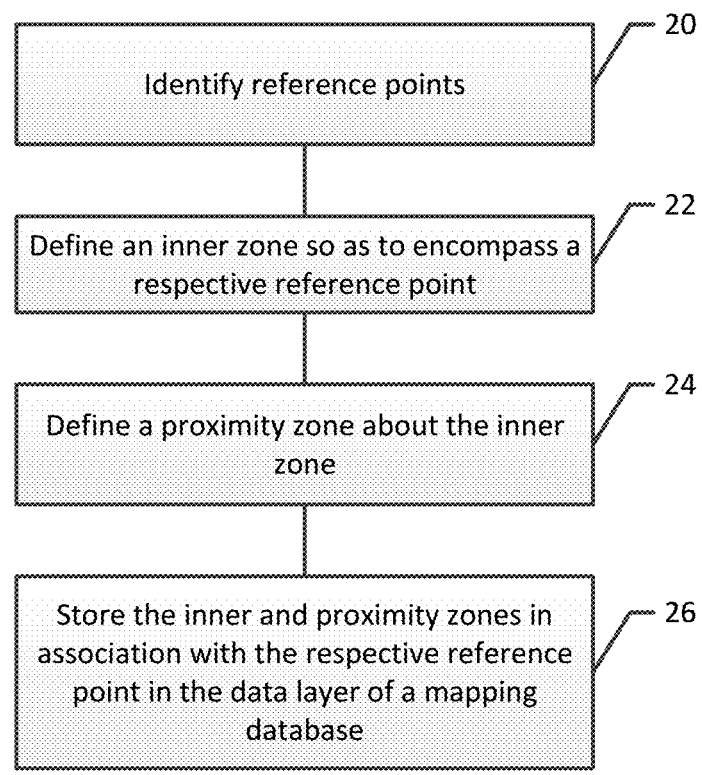
Figure 3:
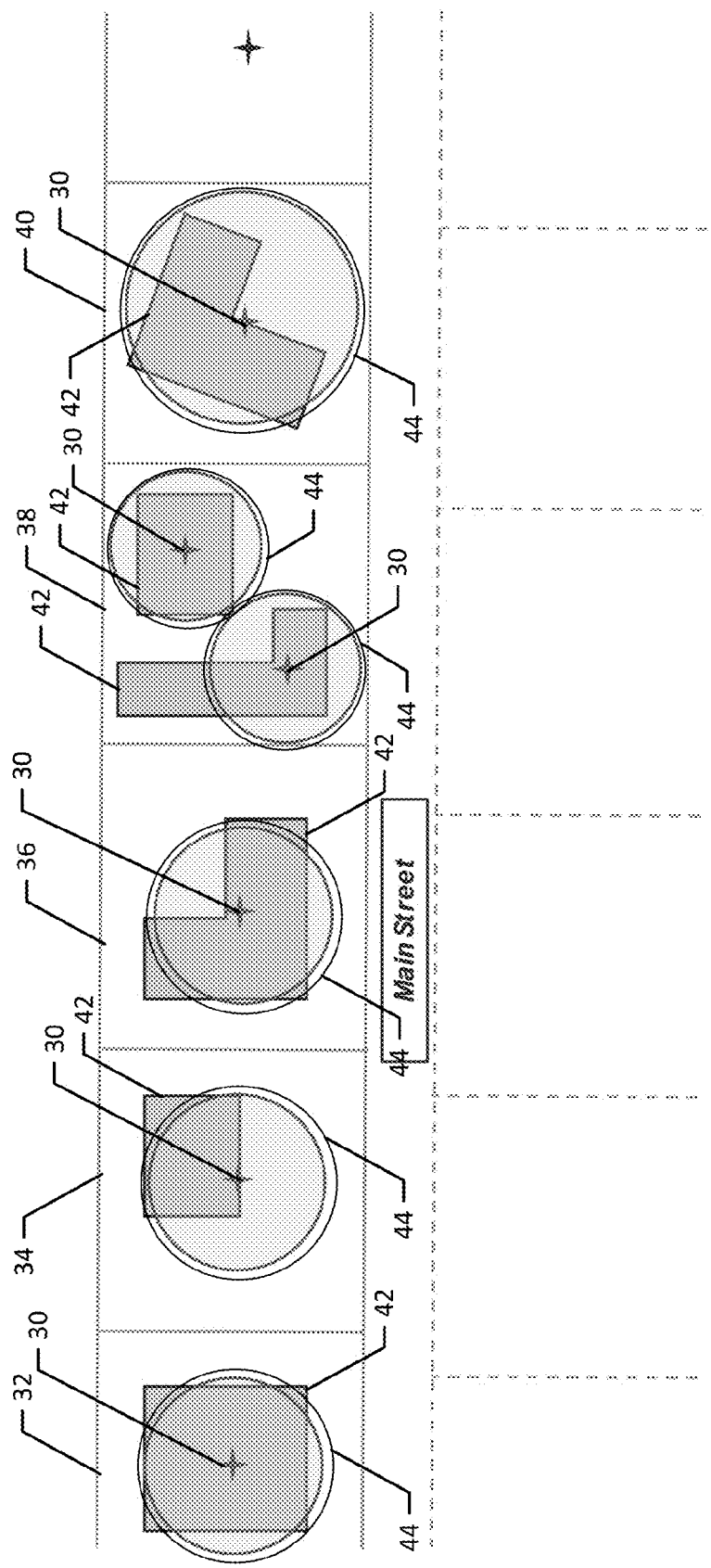
Figure 4:
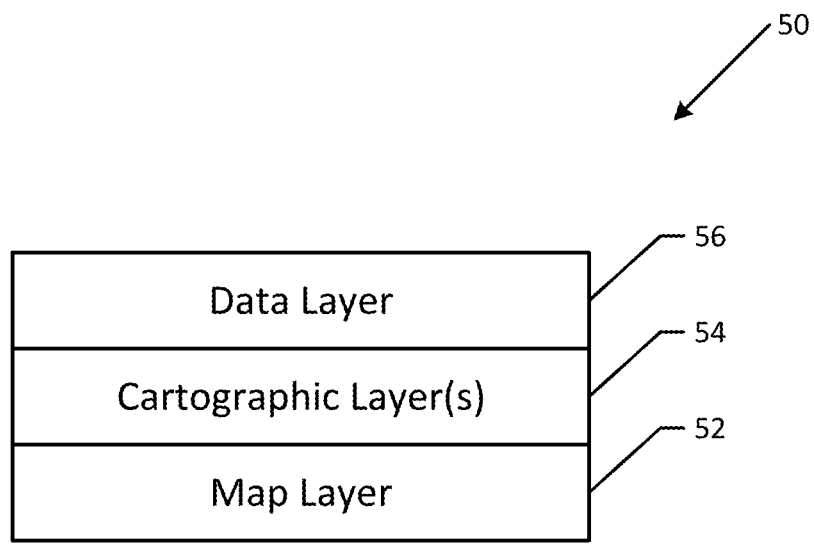
Figure 5:
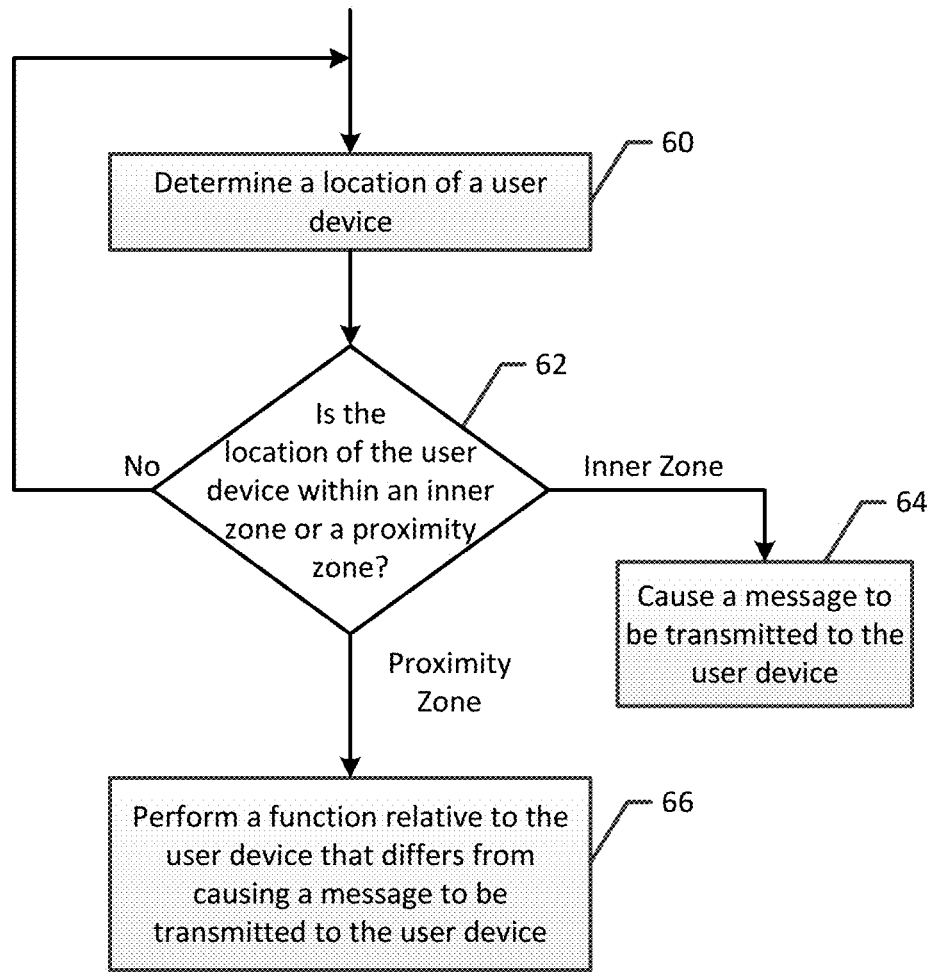
Figure 6:
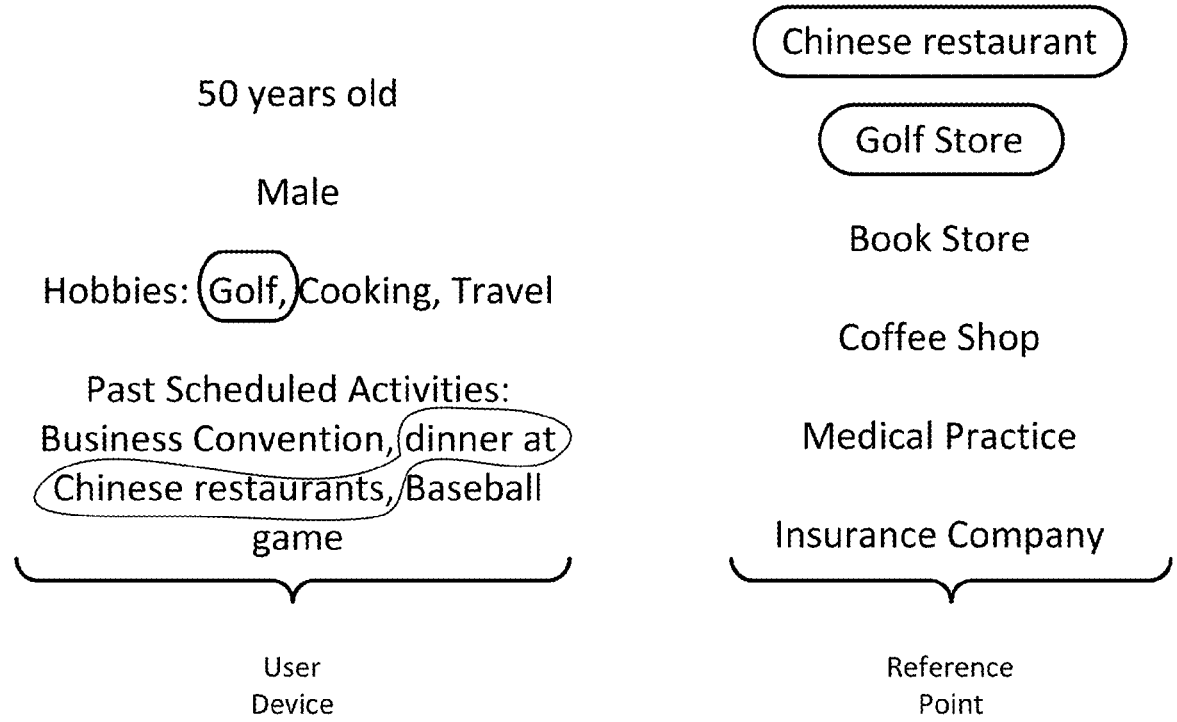
Figure 7:
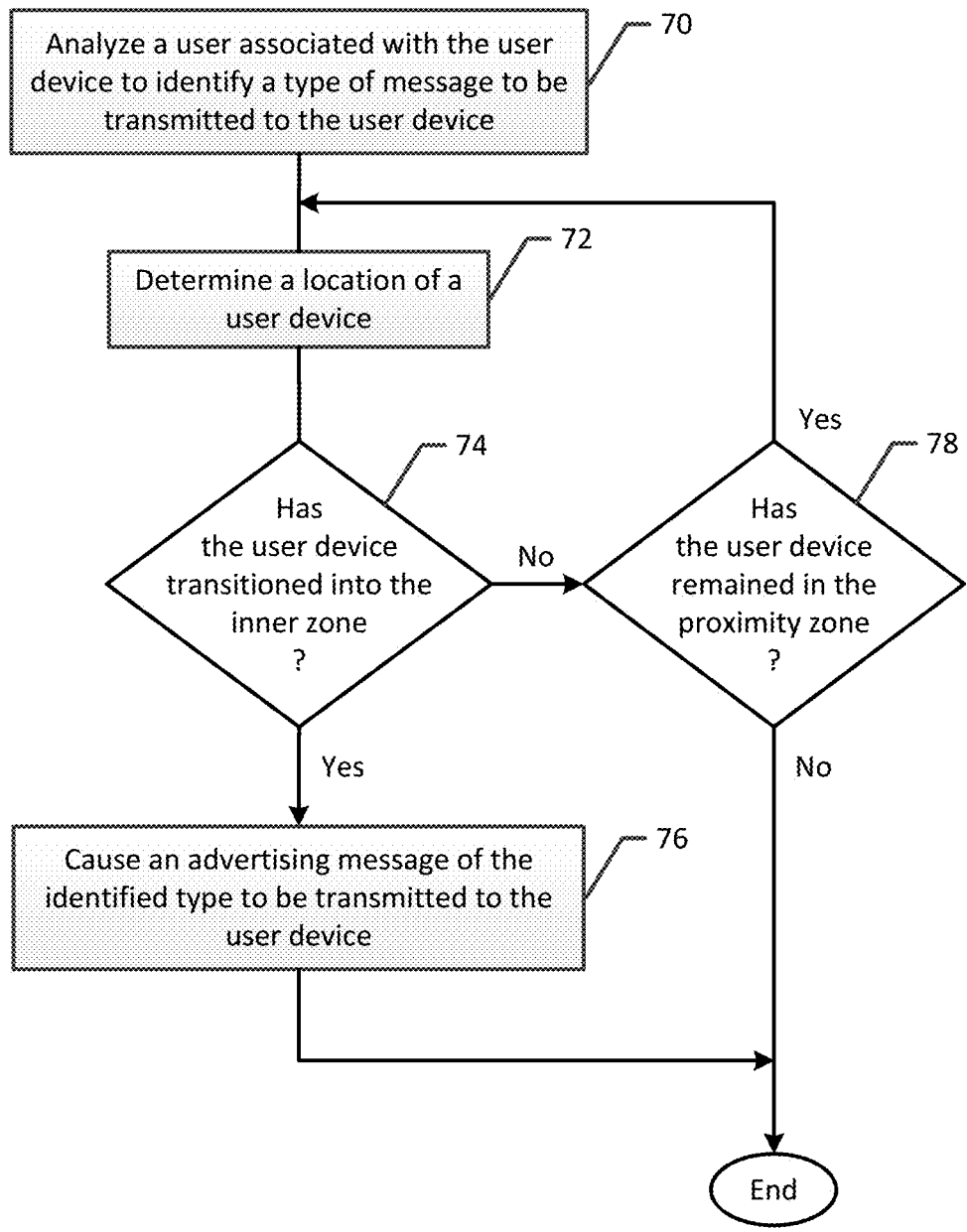

Having thus described certain example embodiments of the present disclosure in general terms, reference will hereinafter be made to the accompanying drawings which are not necessarily drawn to scale, and wherein:

FIG. 1 is block diagram of an apparatus that may be specifically configured in accordance with an example embodiment;

FIG. 2 is a flowchart illustrating operations performed, such as by the apparatus of FIG. 1, in order to define inner and proximity zones in accordance with an example embodiment;

FIG. 3 depicts a plurality of inner and proximity zones in accordance with an example embodiment;

FIG. 4 illustrates the layers of a mapping database in accordance with an example embodiment;

FIG. 5 is a flowchart illustrating operations performed, such as by the apparatus of FIG. 1, in accordance with an example embodiment;

FIG. 6 depicts an association drawn between a user associated with a user device and a reference point in accordance with an example embodiment; and FIG. 7 is a flowchart of the operations performed, such as by the apparatus of FIG. 1, in an instance in which a user device is positioned in a proximity zone, but outside of an inner zone in accordance with an example embodiment.

DETAILED DESCRIPTION

Some embodiments will now be described more fully hereinafter with reference to the accompanying drawings, in which some, but not all, embodiments are shown. Indeed, various embodiments may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present disclosure.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a physical storage medium (e.g., volatile or non-volatile memory device), may be differentiated from a "computer-readable transmission medium," which refers to an electromagnetic signal.

A method, apparatus and computer program product are provided in accordance with an example embodiment in order to facilitate the selective communication with user devices in a manner dependent upon a mapping database. In this regard, messages, such as advertising messages, may be specifically targeted to users associated with a user device in an instance in which the user device is located near the subject of the advertising messages. Additionally, the messages, such as the advertising messages, may be tailored to the user associated with the user device, such as the user carrying or otherwise traveling with the user device, based upon characteristics associated with the user. As such, the user may be provided with information that is both geographically and substantively relevant to the user, while the source of the advertising messages avoids oversaturation of the market and, instead, benefits from specific targeting of the advertising messages.

In order to provide for these selective communication with user devices, a plurality of zones are defined relative to respective reference points. Although the zones may be defined in various manners, the zones of an example embodiment are defined by a computing device that is associated with or otherwise has access to a mapping database. For example, the computing device that is configured to define the zones may be a server or other computer of a map, geographic and/or navigation data developer, such as HERE North America, LLC located in Chicago, Ill. Regardless of the manner in which the computing device that is configured to define the zones is configured, the computing device may include or otherwise be associated with an apparatus 10 as shown in FIG. 1 that may be specifically configured in accordance with an example embodiment.

In this regard, the apparatus 10 of FIG. 1 includes, be associated with or otherwise be in communication with a processor 12, a memory device 14, a communication interface 16 and optionally a user interface 18. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment. For example, the memory device could be configured to buffer input data for processing by the processor. Additionally or alternatively, the memory device could be configured to store instructions for execution by the processor. Still further, the memory device may store a mapping database as described below.

As noted above, the apparatus 10 may be embodied by a computing device. However, in some embodiments, the apparatus may be embodied as a chip or chip set. In other words, the apparatus may comprise one or more physical packages (for example, chips) including materials, components and/or wires on a structural assembly (for example, a circuit board). The structural assembly may provide physical strength, conservation of size, and/or limitation of electrical interaction for component circuitry included thereon. The apparatus may therefore, in some cases, be configured to implement an embodiment on a single chip or as a single "system on a chip." As such, in some cases, a chip or chipset may constitute means for performing one or more operations for providing the functionalities described herein.

The processor 12 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 12 may be configured to execute instructions stored in the memory device 14 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment while configured accordingly. Thus, for example, when the processor is embodied as an ASIC, FPGA or the like, the processor may be specifically configured hardware for conducting the operations described herein.

Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment by further configuration of the processor by instructions for performing the algorithms and/or operations described herein. The processor may include, among other things, a clock, an arithmetic logic unit (ALU) and logic gates configured to support operation of the processor.

The apparatus 10 of an example embodiment may also include a communication interface 16 that may be any means such as a device or circuitry embodied in either hardware or a combination of hardware and software that is configured to receive and/or transmit data from/to other electronic devices in communication with the apparatus. In an embodiment in which the apparatus is embodied by a computing device that is configured to define a plurality of zones, the communication interface may be configured to communicate data with an in-vehicle global positioning system (GPS), in-vehicle navigation system, a personal navigation device (PINT)), a portable navigation device or other in-vehicle data collection system as well as being configured to communicate data with various user devices. The communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication.

The apparatus 10 of an example embodiment may also optionally include or otherwise be in communication with a user interface 18. The user interface may include a touch screen display, a keyboard, a mouse, a joystick or other input/output mechanisms. In some embodiments, the user interface, such as a display, speakers, or the like, may also be configured to provide output to the user. In this example embodiment, the processor 12 may comprise user interface circuitry configured to control at least some functions of one or more input/output mechanisms and/or to receive the user input provided via the input mechanisms, such as the rotatable dial wheel. The processor and/or user interface circuitry comprising the processor may be configured to control one or more functions of one or more input/output mechanisms through computer program instructions (for example, software and/or firmware) stored on a memory accessible to the processor (for example, memory device 14, and/or the like).

The computing device may be configured to define the zones in various manners. In one example embodiment, however, the zones are defined based upon reference points maintained by a mapping database. In this example embodiment, the operations performed, such as by the apparatus 10 of FIG. 1, are depicted in FIG. 2 and include means, such as the processor 12, the memory 14 or the like, for identifying a plurality of reference points. In one embodiment, the reference points are based upon points of interest maintained by a mapping database. Points of interest may be associated with various map features. With respect to a plurality of parcels of land positioned alongside roads as shown in FIG. 3, however, a point of interest may be associated with each parcel of land. However, a point of interest is not generally positioned within a representation of a respective parcel of land within the mapping database, but is, instead, positioned along the center line of the road that passes by, e.g., in front of, the parcel of land as it is the center line of the road that is generally referenced for purposes of the generation of a route, the presentation of a map or the like.

In order to define the zones relative to respective reference points, the points of interest may be converted to respective point addresses. For example, the apparatus 10, such as the processor 12, may be configured to translate the points of interest to respective point addresses. Although the point addresses may be defined in various manners, the point addresses of an example embodiment are defined to be located at the center point of respective parcels of land. Since the points of interest are associated with respective parcels of land, each point of interest may be translated to a respected point address by determining the center point of the respective parcel of land and then positioning the point address at the center point. In one embodiment, each point of interest may be associated with information that defines the center point of the respective parcel of land. Alternatively, the mapping database can include information regarding each parcel of land including a positional definition of the boundaries of the parcel of land and the center point of the parcel of land. The resulting point addresses may serve as the reference points in this example embodiment.

Once the point addresses have been defined at the center points of the parcels of land, the apparatus 10 includes means, such as the processor 12 or the like, for defining an inner zone that encompasses a respective point address for each or at least a plurality of the parcels of land. See block 22 of FIG. 2. Although the inner zones may have various shapes and sizes, the inner zones of an example embodiment have a circular shape and are centered about the respective point address, thereby encompassing the respective reference points, e.g., point addresses. Although the size of the inner zone, such as the radius of a circular inner zone, may be defined in various manners as described below, the inner zone of an example embodiment has a size, such as a radius, that is defined at least in part upon the size of the respective parcel of land. In this regard, the inner zone may be sized so as to be contained within the parcel of land. Thus, the apparatus, such as the processor, may identify the shortest distance from the point address to the boundary of the parcel of land and may then define the inner zone to have a radius that equals or is less than the shortest distance. For example, the radius of the inner zone may be defined to be a predefined amount or a predefined percentage less than the shortest distance between the center point of the parcel of land and the boundary of the parcel of land.

In one example embodiment, a minimum size, such as a minimum radius, and a maximum size, such as a maximum radius, of an inner zone may be defined so as to avoid having undesirably small and undesirably large inner zones based solely on the size of a parcel of land. As such, in this example embodiment, the inner zone may be sized as described above, such as based upon the distance between the point address and the closest boundary of the respective parcel of land. In an instance in which the resulting size of the inner zone exceeds the predefined maximum size, the size of the inner zone may be reduced to the maximum size. Similarly, in an instance in which the resulting size of the inner zone is less than the predefined minimum size, the size of the inner zone may be increased to the minimum size.

By way of example, FIG. 3 depicts a road (Main Street) having a plurality of parcels of land positioned therealong. FIG. 3 also depicts a plurality of reference points 30, as defined by the point addresses located at the center point of each parcel of land. Parcels of land designated 32, 34 and 36 have inner zones 40 defined therein based upon the distance between respective point addresses and the boundaries of the respective parcels of land.

As also shown in FIG. 3, the mapping database may also include information defining the footprint of the buildings on the respective parcels of land such that the resulting presentation of a map may include not only the roads, but also the footprints 42 of the buildings on the various parcels of land in order to provide additional context for the user. In this regard, the mapping database may be a master geographic or navigation database that contains data that represent geographic features in a coverage area. The coverage area may correspond to an entire country, such as the United States. Alternatively, the coverage area may correspond to several countries, According to another alternative, the coverage area may represent only a single region within a geographic area, such as a country, state, province, or city.

In one embodiment, the mapping database includes data used for navigation-related services. For example, the geographic database includes road segment data records, node data records, and cartographic ("carto") data records. Other data records such as, but not limited to, routing data, maneuver data, and point of interest data may also be included.

The road segment data records are links or segments representing roads, streets, or paths. The node data records are end points corresponding to the respective links or segments of the road segment data records. The road segment data records and the node data records represent a road network, such as used by vehicles, cars, and/or other entities. Alternatively, the mapping database contains path segment and node data records or other data that represent pedestrian paths in addition to or instead of the vehicle road record data.

The road segments and nodes may be associated with attributes, such as geographic coordinates, street names, address ranges, speed limits, turn restrictions at intersections, and other navigation related attributes, as well as points of interest, such as gasoline stations, hotels, restaurants, museums, stadiums, offices, automobile dealerships, auto repair shops, buildings, stores, etc. The mapping database may include data about the locations of these points of interest. The mapping database may also include data about places, such as cities, towns, or other communities, and other geographic features, such as bodies of water, mountain ranges, etc. Such place or feature data may be point of interest data or may be associated with points of interest or point of interest data (such as a data point used for displaying or representing a position of a city). The mapping database may include other kinds of information.

The carto data records contain geographic feature information that is used to display image representations (such as maps) of various portions of a geographic region represented by the mapping database. The carto data records are links or segments or polygons that represent geographic features other than roads or paths. For example, the links or link segment data records may represent a country boundary or border, a state boundary or border, a province boundary or border, a county boundary or border, a city or township boundary or border, a river, a lake, a landmark, and/or other geographic features, such as the definition of parcels of land and the footprints 42 of buildings. The carto data records may be associated with position or location information, such as geographic coordinates (e.g., latitude, longitude, and/or altitude) as well as with point of interest data or other data.

The mapping database may be stored in a format that facilitates updating, maintenance, and development. For example, the mapping database or data in the mapping database may be in an Oracle spatial format or other spatial format, such as for development or production purposes. The Oracle spatial format or development/production database may be compiled into a delivery format, such as a GDF format. The data in the production and/or delivery formats may be compiled or further compiled to form geographic database products or databases, which may be used in end user navigation devices or systems. For example, geographic data is compiled (such as into a PSF format) to organize and/or configure the data for performing navigation-related functions and/or services, such as route calculation, route guidance, map display, speed calculation, distance and travel time functions, and other functions, by a navigation device.

The navigation-related functions may correspond to vehicle navigation, pedestrian navigation, or other types of navigation.

As shown in FIG. 4, for example, the mapping database 50 of an example embodiment may include a plurality of layers. For example, the mapping database may include a map layer 52 that includes information, such as the road segment data records and the node data records, regarding the links and nodes along the roads as well as the points of interest defined along the links. Further, the mapping database may include one or more cartographic layers 54 that include the information, such as the cartographic data records, defining the boundaries and center points of the parcels of land and the building footprints 42 on the respective parcels of land. In this regard, the information regarding the building footprints may be image-based representations of the building footprints that may be utilized to provide context for a user viewing a map, but lack spatial intelligence and, as a result, cannot be utilized for comparative purposes with respect to the location of a user device or for the construction of the inner and proximity zones. Typically, the map layer is utilized during the generation of a route, while the information regarding the parcels of land and building footprints are utilized, not for purposes of determining routes, but for display purposes so as to provide additional context to a user. In this example embodiment, the mapping database may also include a data layer 56 that stores a representation of the inner zones 40 (and the proximity zones 44 described below) in conjunction with the respective reference points 30. The data layer stores the representation of the inner zones (and proximity zones) in a manner that provides location awareness and spatial intelligence, such as by associating the representation of the layers to geographic coordinates to facilitate use of the inner and proximity zones for comparative purposes with respect to the location of a user device.

The definition of the inner zones 40 centered about the point addresses 30 within the respective parcels of land may cause and frequently does cause the inner zones to at least partially overlap the building footprints 42. However, the inner zones are not necessarily centered relative to the building footprints, such as in instances in which the building footprint is not centered upon the parcel of land, such as shown in the parcel of land designated 34.

The reference that is utilized to define the inner zone 40 may be differently defined in other embodiments. For example, a reference point may be defined, not based upon the center point of a parcel of land, but based upon a building footprint 42. In this regard, in instances in which a single parcel of land includes two or more buildings having separate footprints, such as the parcel of land designated 38 in FIG. 3, a separate inner zone may be defined for each building with each inner zone defined relative to a different reference point 30 that is defined based upon the footprint of a respective building. The parcels of land that include two or more buildings having separate footprints maybe identified in various manners. For example, the mapping database 50, such as the cartographic layers 54 that define the building footprints and the parcels of land, may include information that identifies those parcels of land that include two or more buildings having separate footprints. Alternatively, the parcels of land having two or more buildings with separate footprints may be identified by a review or other geospatial analysis of video imagery or a like. In this example in which multiple buildings with separate footprints are located within the same parcel of land, inner zones may be defined for each building within the parcel of land. Each inner zone may be centered about a reference point that is defined as the center point or centroid of the footprint of a respective building. Although the inner zones that are defined for respective buildings may be sized in different manners, the inner zones defined for respective buildings may have sizes that are based upon the respective buildings, such as by having a size that is dependent upon the size of the respective building.

In some instances such as shown in the parcel of land designated 38 in FIG. 3, the inner zones 40 defined for the two buildings within the same parcel of land may overlap. In the region of overlap, the inner zone for one building, such as the larger building, may take priority relative to the inner zone for the other building, or the inner zones for both buildings may each be operable in the region of overlap in the same manner as those regions in which the inner zones do not overlap. In other embodiments, the inner zones defined for the two buildings within the same parcel of land may be spaced from one another and, as a result, may not overlap.

In addition to defining an inner zone 40, the apparatus 10 of this example embodiment also includes means, such as the processor 12 or the like, for defining a proximity zone so as to extend at least partially about a respective inner zone. See block 24 of FIG. 2. The proximity zone generally extends completely about the inner zone and, as such, may define an annular region adjacent to the inner zone. The proximity zone may have a predefined width or may have a width that is dependent upon, for example, the size, e.g., the radius, of the inner zone about which the proximity zone extends. By way of example, FIG. 3 depicts proximity zones 44 extending about respective inner zones within each parcel of land. Although the proximity zones may be defined so as to be contained within a respective parcel of land as shown in FIG. 3, proximity zones of other embodiments may extend beyond the boundaries of the respective parcel of land. The apparatus of this example embodiment also includes means, such as the processor, the memory 14 or the like, for storing the inner zones and the proximity zones in association with respective reference points 30. See block 26 of FIG. 2. Although FIG. 3 depicts the inner and proximity zones for purposes of explanation, the inner and proximity zones are not generally included in the map display and, as such, are not generally visible to the user associated with the user device.

Proximity zones 44 may be defined about all of the inner zones 40. Alternatively, proximity zones may only be defined about some of the inner zones, such as the inner zones that encompass a certain type of reference points, such as reference points associated with particular types of business as described below. Additionally, while a single proximity zone is described in the foregoing embodiment to extend about each of the inner zones, two or more proximity zones, each progressively larger than the prior proximity zones, may be defined about some or all of the inner zones. For example, multiple proximity zones may be defined about the inner zones that encompass a certain type of reference points and a single proximity zone may be defined about the inner zones of all other types of reference points. In an instance in which two or more proximity zones surround an inner zone, different functions may be performed in the manner described below in instances in which the user device is determined to be in different ones of the proximity zones.

Once the inner zones 40 and the proximity zones 44 have been defined relative to each reference point 30, such as each point address, the inner zones and proximity zones may be utilized in order to selectively communicate with user devices. The user devices may be embodied in various manners, such as a mobile telephone, a tablet computer, a portable computer, a personal digital assistant, an in-dash vehicle navigation system, a personal navigation system or the like. The selective communication with a user device may be directed by any of a variety of computing devices, such as a computing device, e.g., a server or other computer of a map, geographic and/or navigation data developer, such as HERE North America, LLC, or the user device itself.

In this regard and as shown in block 60 of FIG. 5, an apparatus 10 as embodied by a computing device may include means, such as the processor 12 or the like, for determining the location of a user device. In this regard, the location of a user device may be determined in various manners. For example, the user device may include a global positioning system in order to identify its location. Alternatively, the location the user device maybe determined based upon the user utilizing their user device in order to record its arrival at a place of business, such as restaurant, a doctor's office or the like. As yet another example, the location of the user device may be determined based on a schedule of the user associated with the user device with the schedule identifying appointments at various locations at particular periods of time throughout the day.

Regardless of the manner in which the location of the user device is determined, the apparatus 10 also includes means, such as the processor 12 or the like, for determining whether the location of the user device is within an inner zone 40 or a proximity zone 44 that extends at least partially about the inner zone. See block 62 of FIG. 5. In an instance in which the plurality of inner zones and corresponding proximity zones that have been defined relative to a plurality of reference points have been stored, such as in a mapping database 50, the apparatus, such as the processor, may access the mapping database, such as the data layer 56 that defines the inner and proximity layers, in order to determine whether the location of the user device is within one or more of the zones. In an instance in which the selective communication with a user device is directed by the user device itself, the user device may be configured to execute an application that is configured to communicate with a map, geographic and/or navigation data developer in order to determine whether the location of the user device is within one or more of the zones.

In an instance in which the user device is determined to be within an inner zone 40, the apparatus 10 includes means, such as the processor 12, the communications interface 16 or the like, for causing a message to be transmitted to the user device, such as for display or other presentation to the user associated with the user device. See block 64 of FIG. 5. Various types of messages may be transmitted to a user device. In an example embodiment, however, an advertising message is transmitted to the user device in an instance in which the user device is determined to be located within the inner zone of a respective reference point. In this regard, the advertising message that is transmitted may be based upon a determination of an association between the user associated with the user device and the reference point encompassed by the inner zone within which the user device is located.

The user device and the reference point may be associated in various manners. For example, the reference point may be associated with information that identifies the owner of the building, the tenants within the building, the places of business that operate at the building, or other information regarding the respective location. The information associated with the reference point may be stored, for example, within the map layer 52 that stores the points of interest and accessible by the apparatus 10. By way of example, FIG. 6 depicts information associated a particular reference point that indicates that a building located within the parcel of land identified by the reference point includes a Chinese restaurant, a golf store, a book store, a coffee shop, a medical practice and an insurance company.

Additionally, information may be collected by or otherwise accessed by the apparatus 10 regarding the user associated with the user device, such as information that may be obtained from a profile of the user that identifies, for example, the age, the sex, the hobbies or other interests or preferences of the user or the like. Additionally, information regarding the user associated with the user device may be collected based upon prior activities in which the user participated or attended, such as particular meetings, seminars, conferences, sporting events, concerts or the like, such as may be identified by a schedule maintained by the user device. Still further information regarding the user associated with user device may be gathered from the context associated with prior locations that the user device has visited, such as information regarding the particular types of restaurants that the user associated with the user device frequents. By way of example, FIG. 6 depicts information regarding the user associated with the user device that indicates that the user is 50 years old and male, enjoys golf, cooking and travel, has recently attended a business convention and a baseball game and has frequented a Chinese restaurant.

Based upon the information associated with the reference point and the information associated with the user of the user device, the apparatus 10 may include means, such as the processor 12 or the like, for determining an association between the user and the reference point, such as by determining one or more matches or other correlations between interests, hobbies or other information regarding the user and places of business associated with the reference point, such as places of business within the building to which the user is proximate. As shown in FIG. 6, for example, the building may include a golf store and the information associated with the user may identify golf to be a hobby of the user. As such, the apparatus, such as the processor, the communication interface 16 or the like, may be configured to provide an advertising message to the user device highlighting the golf store that is located within the building. Still further with respect to the example of FIG. 6, the information regarding the reference point may identify the presence of a Chinese restaurant and the information associated with the user may identify that the user frequents Chinese restaurants. As such, the apparatus, such as the processor, the communication interface or the like, may cause an advertisement of the Chinese restaurant to be provided to the user device or presentation to the user.

Prior to entering the inner zone 40, the user device is generally located within the proximity zone 44 that extends about the inner zone. In an instance in which the user device is determined (by block 62) to be in the proximity zone, the apparatus 10 also include means, such as the processor 12, the communication interface 16 or the like, for performing a function relative to the user device that differs from causing the message to be transmitted to the user device, as would be performed once the user device enter into the inner zone. By way of illustration, FIG. 7 depicts one example of the function performed in an instance in which the user device is identified to be within the proximity zone. In this example, in an instance in which the user device is identified to be located within the proximity zone, the apparatus may include means, such as the processor or the like, for performing an analysis of the user associated with the user device in order to identify a type of message to be transmitted to the user in an instance in which the user is subsequently determined to be within the inner zone. See block 70 of FIG. 7. For example, the apparatus, such as the processor, may be configured to determine the association between the user and the reference point based upon information associated with the user and information associated with the reference point, as described above and as illustrated, by way of example, by FIG. 6. In this regard, the apparatus, such as the processor, may be configured to analyze information regarding the user, such as user preference data, gender data, age data, search history data, calendar data, location history data, etc. in order to determine a potential interest that the user may have in one or more businesses associated with the reference point (as defined by the information associated with the reference point) which, in turn, may define the type of message to be transmitted to the user device. In regards to the type of message to be transmitted to the user device, the analysis of information regarding the user may not simply define the business with which an advertising message is associated, but, in some embodiments, the product that is the subject of the advertisement or the type of discount that is offered to the user. For example, in an instance in which a user device is in a proximity zone about a building that houses a coffee shop, an advertising message may be transmitted to the user device to advertise a particular coffee flavor or other product based on the analysis of the information regarding the user, since the user's age and/or preference may indicate that the particular coffee flavor or other product would likely be of most interest to the user. Similarly, the advertising message may offer a discount that varies based on the analysis of the information regarding the user, such as the user's age and/or occupation, e.g., a student discount.

By performing this analysis, including, for example, a determination of an association between the user and the reference point, while the user device is within the proximity zone 44, the apparatus 10, such as the processor 12, the communication interface 16 or the like, is configured to cause the advertising message to be transmitted to the user device in an instance in which the user device is subsequently determined to transition from the proximity zone to the inner zone 40 in an efficient and timely manner. Thus, the performance of the analysis between information associated with the user and information associated with the reference point while the user device is located within the proximity zone but outside of the inner zone permits the apparatus, such as the processor, to perform the analysis in a more scheduled manner and, as such, is less disruptive from a processing resource standpoint since the apparatus does not have to immediately perform the analysis upon the transition of the user device into the inner zone. Thus, the method, apparatus and computer program product of an example embodiment provide for a more efficient utilization of the processing resources while also providing more timely messaging to the user.

In regards to determining the type of message to be transmitted to the user, the apparatus 10, such as the processor 12, may be configured to determine a plurality of messages to be provided to the user device and the order and timing in which the plurality of messages are to be provided to the user device once the user device has entered the inner zone 40. In this regard, a plurality of messages to be provided to the user device may be identified by an analysis of the associations between the user and the reference point based upon information associated with the user and information associated with the reference point. With respect to the example of FIG. 6, advertising messages relating to the golf store and the Chinese restaurant may be identified as likely being of interest to the user associated with the user device. The apparatus, such as the processor, may be configured to determine the order and the timing with which the plurality of messages are provided to the user device based upon information associated with the user, such as the age, gender, preferences, hobbies, activities, etc. of the user associated with the user device, and the likely interest that the user has in subject of a message as determined from the information associated with the user. Thus, the message(s) relating to a subject that is determined to be likely of more interest to the user may be provided sooner and/or for a longer period of time than the message(s) relating to a subject that is determined to be likely of lesser interest to the user. With respect to the example of FIG. 6, the apparatus, such as the processor, may determine that the user plays golf more frequently than the user eats Chinese food, such that the advertising message for the golf store is provided initially and for a longer time than the subsequently provided advertising message for the Chinese restaurant.

By way of further explanation, after having analyzed a user associated with the user device to identify the type of messaging to be transmitted to the user device, the apparatus 10 of an example embodiment includes means, such as the processor 12 or the like, for determining, e.g., updating, the location of the user device and means, such as the processor or the like, for determining whether the user device has transitioned into the inner zone 40. See blocks 72 and 74 of FIG. 7. In an instance in which the user device has transitioned into the inner zone, the apparatus includes means, such as the processor, the communication interface 16 or the like, for causing an advertising message of the identified type to be transmitted to the user device. See block 76. However, in an instance in which the user device has not transitioned into the inner zone, the apparatus includes means, such as the processor or the like, for determined whether the user device has remained in the proximity zone 44. See block 78. In the instance in which the user device has remained in the proximity zone, the location of the user device is again determined, e.g., updated, and the process repeats as shown. Alternatively, in an instance in which the user device has not transitioned into the inner zone and is no longer within the proximity zone, the process may end.

In regards to the determination of the type of message to be provided to the user device upon transitioning to the inner zone 40, the apparatus 10, such as the processor 12, may be configured to determine that it would not be appropriate to provide any messages to the user device even if the user device did enter the inner zone, such that the functionality otherwise provided in conjunction with the inner zone (and optionally the proximity zone 44) may be deactivated for the user device, at least temporarily. This determination may be based upon various types of information, such as an analysis of the information associated with the user and the information associated with the reference point which concludes that the user would not likely have an interest in any of the places of business associated with the reference point. Additionally or alternatively, the determination to forego the provision of messages to the user device may be based upon other information, such as the time of day, the location, the weather, the user history with respect to businesses associated with the reference point, etc. In this example embodiment in which a determination is made that it would not be appropriate to provide messages to the user device, even if the user device were subsequently determined to be located within the inner zone, no messages would be provided to the user device.

Various functions may be performed relative to the user device in instances in which the user device is within the proximity zone, but outside of the inner zone. For example, in addition to or instead of performing an analysis of the user associated with the user device to identify the type of message to be transmitted to the user device in instance in which the user device subsequently transitions to the inner zone, the apparatus 10 of an example embodiment may include means, such as the processor 12, the communications interface 16 or the like, for identifying an association between the user and the reference point and for causing a first message to be transmitted to the user device while the user devices is within the proximity zone. Thereafter, a second message may be transmitted to the user device in an instance in which the user device transitions into the inner zone. For example, the first message may be a more general advertising message, while the second message may be a more specific advertising message focused, for example, on particular sales or specials that may be of interest to the user. By way of example in which the user has an interest in golf and the reference point is associated with a parcel of land on which a building that houses a golf store is located, the first message may generally advertise the presence of the golf store, while the second message may alert the user to particular sales or specials that are currently being offered by the golf store.

The size of the inner zone 40 and the proximity zone 44 relative to a respective reference point may be defined in various manners. As described above, the size of the inner zone and, in turn, the size of the proximity zone about the inner zone may be dependent upon the size of the parcel of land. Alternatively, the size of the inner zone may be based upon the size of the building footprint 42 as also described above. However, the size of the inner zone and the proximity zone may additionally or alternatively be based upon the type of reference point. For example, reference points associated with particular types of businesses, such as particular coffee shop franchises or particular retail outlets, may include larger inner zones and correspondingly larger proximity zones than reference points that are not associated with the particular coffee shop franchises or the particular retail outlets. See, for example, the larger inner and proximity zones in the parcel of land designated 40 in FIG. 3. As such, user devices will receive messages as a result of having entered into the inner zones about the particular coffee shop franchises or the particular retail outlets when the user device is further away from the particular coffee shop franchises or the particular retail outlets as a result of the enlarged inner zones and proximity zones about these reference points. Thus, by enlarging the inner and proximity zones based upon the type of business that is associated with a particular reference point, more advertising messages may be provided for some business establishments than other business establishments.

In another example embodiment, the sizes of the inner zone 40 and the proximity zone 44 may be dynamically sized in different manners. For example, the inner zone may remain the same size, but the proximity zone may be sized to be either larger or smaller than its standard size based on various factors, such as the type of reference point and/or information relating to the user device, such as information defining the preferences, interests, hobbies, etc. of the user associated with the user device. In this regard, the proximity zone may be enlarged in some instances, such as for certain types of reference points, in order to provide additional time for analysis of the relationship of the user device to the reference point and the identification of the type of messages or other functionality to be provided upon entry into the inner zone. Similarly, the inner zone (or both the inner zone and the proximity zone) may be sized to be either larger or smaller than its standard size based on an association between information relating to the reference point and information relating to the user device, such as information defining the preferences, interests, hobbies, etc. of the user associated with the user device. In this regard, the inner zone may be enlarged (or even activated in some instances) if the association between information relating to the reference point and information relating to the user device indicates that the user associated with the user device may have an interest in a business associated with the reference point. Additionally, the inner zone may be shrunk (or even deactivated in some instances) if the association between information relating to the reference point and information relating to the user device indicates that the user associated with the user device does not have an interest in any business associated with the reference point. In an instance in which the user is a skateboarder, for example, the inner zone defined to encompass reference points that are associated with buildings that house skate shops may be enlarged while the inner zone defined to encompass reference points that are associated with buildings that do not house skate shops but which, instead, house business with which the user does not have any interest may be shrunk for purposes of causing messages to be transmitted to or providing other functionality for the user device of the skateboarder, but not for the user devices of other users with no discernible interest in skateboarding. Thus, the sizes of the inner and/or proximity zones may dynamically vary based upon information relating to the user device in order to further tailor the functionality provided by the method, apparatus and computer program product of an example embodiment to a user.

In addition to or instead of modifying the sizes of the inner and proximity zones for certain types of reference points, the apparatus 10, such as the processor 12, of an example embodiment may only construct inner and proximity zones for certain types of reference points, but not for other types of reference point. For example, the type of a reference point may be dependent upon the type of businesses that are associated with the respective reference point such that the inner and proximity zones are only constructed for reference points associated with certain types of businesses, but not for reference points associated with other types of businesses. Thus, the method, apparatus and computer program product of an example embodiment may be configured to provide messages for certain types of businesses, but not for all types of businesses so as to further avoid information saturation of the user.

As described above, the zones are defined based upon reference points maintained by a mapping database. As also described above, the reference points may be based upon points of interest maintained by a mapping database. Although the points of interest that have been discussed above by way of example have been associated with parcels of land, the points of interest may be associated with various other map features, such as statues, sports fields, parks and the like. The method, apparatus and computer program product of an example embodiment may therefore define zones about reference points that are based upon points of interest that are associated with map features other than a parcel of land, such as by constructing inner and proximity zones about statues, sports fields, parks and the like, and then causing messages to be transmitted to a user device or perform other functionality in regards to the suer device in the same manner as described above in an instance in which the user device is determined to be located within the inner or proximity zones that are constructed around these other types of reference points. As described above, FIGS. 2, 5 and 7 illustrate flowcharts of an apparatus 10, method and computer program product according to example embodiments. It will be understood that each block of the flowcharts, and combinations of blocks in the flowcharts, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 14 of an apparatus employing an embodiment of the present disclosure and executed by a processor 12 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, some of which have been described above. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method of selectively communicating with user devices in a manner dependent upon a mapping database, the method comprising:
    determining a location of a user device;
    dynamically sizing at least one of an inner zone or a proximity zone extending at least partially about the inner zone based upon information related to the user device;
    determining whether the location of the user device is within the inner zone or the proximity zone, wherein the inner zone is defined to encompass a reference point;
    in an instance in which the user device is determined to be within the inner zone, causing a plurality of messages to be transmitted to the user device; and
    in an instance which the user device is determined to be in a proximity zone but outside of the inner zone, performing a function relative to the user device that differs from causing the messages to be transmitted to the user device, wherein performing the function comprises performing an analysis of user data associated with the user device while in the proximity zone but outside of the inner zone to identify a type of message to be transmitted to the user device and to determine a timing with which the plurality of messages are to be transmitted to the user device in an instance in which the user device is subsequently determined to transition from the proximity zone to the inner zone so as to be within the inner zone such that the type of message transmitted to the user device while within the inner zone was identified based upon the analysis performed prior to entry of the user device into the inner zone while the user device was within the proximity zone outside of the inner zone, and wherein the user data that is analyzed to determine the type of message to be transmitted comprises one or more of user preference data, gender data, age data, search history data or calendar data, and
    wherein causing the messages to be transmitted to the user device comprises causing the plurality of messages to be transmitted to the user device in accordance with the time while the user device is within the inner zone such that a message relating to a subject that is of more interest as determined from the user data is provided for a longer period of time than a message relating to a subject that is of lesser interest.

2. A method according to claim 1 wherein performing the analysis of the user data associated with the user device that is determined to be in the proximity zone comprises determining an association between the user and the reference point, and wherein causing the message to be transmitted comprises causing an advertising message to be transmitted to the user device in an instance in which the user device is determined to transition from the proximity zone to the inner, zone.

3. A method according to claim 1 wherein the reference point comprises a point address of a land parcel, and wherein the method further comprises defining the inner zone based at least in part upon a size of the land parcel.

4. A method according to claim 1 wherein the reference point is positioned based at least in part upon a building footprint.

5. A method according to claim 1 wherein determining whether the location of the user device is within the inner zone or the proximity zone comprises accessing a data layer that defines the inner and proximity zones for each of a plurality of reference points, wherein the data layer is a different layer than cartographic layers that define building footprints and land parcels and a map layer that includes a plurality of links, nodes and points of interest.

6. A method according to claim 1 further comprising determining whether an inner zone is to be defined to encompass a reference point based upon one or more characteristics of the reference point.

7. A method according to claim 1 further comprising defining the inner zone that encompasses a reference point to have a size that is dependent upon one or more characteristics of the reference point.

8. A method according to claim 1 further comprising determining, in an instance in which the user device is within the proximity zone, whether a message should be transmitted and, following transition of the user device to the inner zone, at least temporarily deactivating message transmission to the user device in an instance in which a determination is made that the message should not be transmitted to the user device.

9. A method according to claim 1 wherein the user data that is analyzed to determine the type of message to be transmitted comprises one or more of gender data, age data, or calendar data.

10. An apparatus for selectively communicating with user devices in a manner dependent upon a mapping database, the apparatus comprising at least one processor and at least one memory including computer program instructions, the at least one memory and the computer program instructions, with the at least one processor causing the apparatus to:
    determining a location of a user device;
    dynamically sizing at least one of an inner zone or a proximity zone extending at least partially about the inner zone based upon information related to the user device;
    determining whether the location of the user device is within the inner zone or the proximity zone, wherein the inner zone is defined to encompass a reference point;
    in an instance in which the user device is determined to be within the inner zone, causing a plurality of messages to be transmitted to the user device; and
    in an instance which the user device is determined to be in a proximity zone but outside of the inner zone, perform a function relative to the user device that differs from causing the messages to be transmitted to the user device, wherein the at least one memory and the computer program instructions, with the at least one processor, cause the apparatus to perform the function comprises performing an analysis of user data associated with the user device while in the proximity zone but outside of the inner zone to identify a type of message to be transmitted to the user device and to determine a timing with which the plurality of messages are to be transmitted to the user device in an instance in which the user device is subsequently determined to transition from the proximity zone to the inner zone so as to be within the inner zone such that the type of message transmitted to the user device while within the inner zone was identified based upon the analysis performed prior to entry of the user device into the inner zone while the user device was within the proximity zone outside of the inner zone, and wherein the user data that is analyzed to determine the type of message to be transmitted comprises one or more of user preference data, gender data, age data, search history data or calendar data, and
    wherein messages are caused to be transmitted to the user device by causing the plurality of messages to be transmitted to the user device in accordance with the timing while the user device is within the inner zone such that a message relating to a subject that is of more interest as determined from the user data is provided for a longer period of time than a message relating to a subject that is of lesser interest.

11. Art apparatus according to claim 10 wherein the at least one memory and the computer program instructions, with the at least one processor, cause the apparatus to perform the analysis of the user data associated with the user device that is determined to be in the proximity zone by determining an association between the user and the reference point, and wherein the at least one memory and the computer program instructions, with the at least one processor, cause the apparatus to cause the message to be transmitted by causing an advertising message to be transmitted to the user device in an instance in which the user device is determined to transition from the proximity zone to the inner zone.

12. An apparatus according to claim 10 wherein the reference point comprises a point address of a land parcel, and wherein the at least one memory and the computer program instructions, with the at least one processor, also cause the apparatus to define the inner zone based at least in part upon a size of the land parcel.

13. An apparatus according to claim 10 wherein the reference point is positioned based at least in part upon a building footprint.

14. An apparatus according to claim 10 wherein the at least one memory and the computer program instructions, with the at least one processor, cause the apparatus to determine whether the location of the user device is within the inner zone or the proximity zone by accessing a data layer that defines the inner and proximity zones for each of a plurality of reference points, wherein the data layer is a different layer than cartographic layers that define building footprints and land parcels and a map layer that includes a plurality of links, nodes and points of interest.

15. An apparatus according to claim 10 wherein the at least one memory and the computer program instructions, with the at least one processor, further cause the apparatus to determine, in an instance in which the user device is within the proximity zone, whether, a message should be transmitted and, following transition of the user device to the inner zone, to at least temporarily deactivate message transmission to the user device in an instance in which a determination is made that the message should not be transmitted to the user device.

16. An apparatus according to claim 10 wherein the user data that is analyzed to determine the type of message to be transmitted comprises one or more of gender data, age data, or calendar data.

17. A computer program product for selectively communicating with user devices in a manner dependent upon a mapping database, the computer program product comprising at least one non-transitory computer-readable medium bearing instructions embodied therein for use with a computer, the computer program instructions comprising program instructions which, when executed, cause the computer at least to:

determine a location of a user device;

dynamically size at least one of an inner zone or a proximity zone extending at least partially about the inner zone based upon information related to the user device;

determine whether the location of the user device is within the inner zone or the proximity zone, wherein the inner zone is defined to encompass a reference point;

in an instance in which the user device is determined to be within the inner zone, cause a plurality of messages to be transmitted to the user device; and in an instance which the user device is determined to be in a proximity zone but outside of the inner zone, perform a function relative to the user device that differs from causing the messages to be transmitted to the user device, wherein the program instructions are configured to perform the function comprise program instructions configured to perform an analysis of user data associated with the user device while in the proximity zone but outside of the inner zone to identify a type of message to be transmitted to the user device and to determine a timing with which the plurality of messages are to be transmitted to the user device in an instance in which the user device is subsequently determined to transition from the proximity zone to the inner zone so as to be within the inner zone such that the type of message transmitted to the user device while within the inner zone was identified based upon the analysis performed prior to entry of the user device into the inner zone while the user device was within the proximity zone outside of the inner zone, and wherein the user data that is analyzed to determine the type of message to be transmitted comprises one or more of user preference data, gender data, age data, search history data or calendar data, and wherein messages are caused to be transmitted to the user device by causing the plurality of messages to be transmitted to the user device in accordance with the timing while the user device is within the inner zone such that a message relating to a subject that is of more interest as determined from the user data is provided for a longer period of time than a message relating to a subject that is of lesser interest.

18. A computer program product according to claim 17 wherein the program instructions configured to perform the analysis of the user data associated with the user device that is determined to be in the proximity zone comprise program instructions configured to determine an association between the user and the reference point, and wherein the program instructions configured to cause the message to be transmitted comprise program instructions configured to cause an advertising message to be transmitted to the user device in an instance in which the user device is determined to transition from the proximity zone to the inner zone.

19. A computer program product according to claim 17 wherein the reference point comprises a point address of a land parcel, and wherein the computer program instructions further comprise program instructions which, when executed, cause the computer to define the inner zone based at least in part upon a size of the land parcel.

20. A computer program product according to claim 17 wherein the reference point is positioned based at least in part upon a building footprint.

21. A computer program product according to claim 17 wherein the program instructions configured to determine whether the location of the user device is within the inner zone or the proximity zone comprise program instructions configured to access a data layer that defines the inner and proximity zones for each of a plurality of reference points, wherein the data layer is a different layer than cartographic layers that define building footprints and land parcels and a map layer that includes a plurality of links, nodes and points of interest.

22. A computer program product according to claim 17 wherein the program instructions configured to perform the analysis of the user data associated with the user device comprise program instructions configured to determine a timing with which a plurality of messages are to be transmitted to the user device in an instance in which the user device is subsequently determined to be within the inner zone, and wherein the program instructions configured to cause a message to be transmitted to the user device comprise program instructions configured to cause the plurality of messages to be transmitted to the user device in accordance with the timing while the user device is within the inner zone such that a message relating to a subject that is of more interest to the user as determined from the user data is provided for a longer period of time than a message relating to a subject that is of lesser interest to the user.

23. A computer program product according to claim 17 wherein the computer program instructions further comprise program instructions configured to determine, in an instance in which the user device is within the proximity zone, whether a message should be transmitted and, following transition of the user device to the inner zone, to at least temporarily deactivate message transmission to the user device in an instance in which a determination is made that the message should not be transmitted to the user device.

24. A computer program product according to claim 17 wherein the program instructions configured to wherein the user data that is analyzed to determine the type of message to be transmitted comprises one or more of gender data, age data, or calendar data.

\* \* \* \* \*

UNITED STATES PATENT AND TRADEMARK OFFICE
CERTIFICATE OF CORRECTION

| | |
|---|---|
| PATENT NO. | : 10,200,816 B2 |
| APPLICATION NO. | : 15/042720 |
| DATED | : February 5, 2019 |
| INVENTOR(S) | : Dirk Nel |

It is certified that error appears in the above-identified patent and that said Letters Patent is hereby corrected as shown below:

In the Claims

Column 20
Line 11, "of" should read –for–
Line 26, "an instance which" should read –an instance in which–
Line 52, "time" should read –timing–

Column 21
Line 45, "determining" should read –determine–
Line 52, "an instance which" should read –an instance in which–
Line 53, "a" should read –the–

Column 22
Line 10, "wherein messages" should read –wherein the messages–
Line 18, "Art" should read –An–

Column 23
Line 17, "an instance which" should read –an instance in which–

Signed and Sealed this
Third Day of December, 2019

Andrei Iancu
*Director of the United States Patent and Trademark Office*